United States Patent
Cary et al.

(10) Patent No.: US 7,175,760 B2
(45) Date of Patent: Feb. 13, 2007

(54) WATER DISPENSING APPARATUS WITH WATER RECIRCULATION LINE

(75) Inventors: George S. Cary, Omaha, NE (US); Tyler L. Adam, Omaha, NE (US)

(73) Assignee: Innowave, Inc., Omaha, NE (US)

( * ) Notice: Subject to any disclaimer, the term of this patent is extended or adjusted under 35 U.S.C. 154(b) by 95 days.

(21) Appl. No.: 10/887,790

(22) Filed: Jul. 7, 2004

(65) Prior Publication Data

US 2006/0006104 A1    Jan. 12, 2006

(51) Int. Cl.
*C02F 1/32* (2006.01)

(52) U.S. Cl. ............. 210/123; 210/167.01; 210/172.1; 210/175; 210/416.3; 210/748; 250/436

(58) Field of Classification Search ................ 210/167, 210/175, 121, 123, 416.1, 416.3, 903, 167.01, 210/172.1, 748; 250/432, 436; 222/146.1, 222/189.06
See application file for complete search history.

(56) References Cited

U.S. PATENT DOCUMENTS

| | | | |
|---|---|---|---|
| 327,269 | A | 9/1885 | Hegeman |
| 2,786,211 | A | 3/1957 | Culver, Jr. |
| 3,535,513 | A | 10/1970 | Cirami |
| 4,320,085 | A | 3/1982 | Takeguchi et al. |
| 4,372,860 | A | 2/1983 | Kaas |
| 4,390,432 | A | 6/1983 | Takeguchi et al. |
| 4,623,467 | A * | 11/1986 | Hamlin ........................ 210/652 |
| 4,752,401 | A | 6/1988 | Bodenstein |
| 4,757,921 | A * | 7/1988 | Snowball ................. 222/146.6 |
| 4,902,411 | A | 2/1990 | Lin |
| 4,959,142 | A | 9/1990 | Dempo |
| 4,969,991 | A | 11/1990 | Valadez |
| 5,032,290 | A | 7/1991 | Yamagata et al. |
| 5,258,124 | A * | 11/1993 | Bolton et al. ................ 210/748 |
| 5,271,830 | A | 12/1993 | Faivre et al. |
| 5,293,654 | A | 3/1994 | Castwall et al. |
| 5,303,739 | A | 4/1994 | Ellgoth et al. |
| 5,309,938 | A | 5/1994 | Ellgoth et al. |
| 5,324,424 | A * | 6/1994 | Hochgatterer ................ 210/123 |
| 5,324,438 | A | 6/1994 | McPhee et al. |
| 5,351,337 | A | 9/1994 | Deutsch |
| 5,471,063 | A * | 11/1995 | Hayes et al. ................. 250/436 |
| 5,540,835 | A | 7/1996 | Sanderson |
| 5,622,207 | A | 4/1997 | Frank |
| 5,683,576 | A | 11/1997 | Olsen |
| 5,711,657 | A * | 1/1998 | Hoffmeier .................... 417/319 |
| 5,785,845 | A * | 7/1998 | Colaiano ..................... 210/167 |

(Continued)

FOREIGN PATENT DOCUMENTS

DE        19706580    *  8/1998

(Continued)

*Primary Examiner*—Fred G. Prince
(74) *Attorney, Agent, or Firm*—Merchant & Gould P.C.

(57) ABSTRACT

A water purification and dispensing apparatus includes a water reservoir, a recirculation line having an inlet end connected to the reservoir and an outlet end connected to the reservoir, a pump connected to the recirculation line for pumping water through the recirculation line, and a water treatment mechanism in the recirculation line between the inlet end and the outlet end. The treatment mechanism includes an ultraviolet lamp. Further, a first water dispensing outlet is connected to the reservoir, and a second water dispensing outlet is connected to the reservoir.

10 Claims, 3 Drawing Sheets

U.S. PATENT DOCUMENTS

| | | | |
|---|---|---|---|
| 5,794,658 A | 8/1998 | Saikin | |
| 5,817,231 A | 10/1998 | Souza | |
| 5,928,506 A * | 7/1999 | Bae | 210/94 |
| 6,001,258 A | 12/1999 | Sluys et al. | |
| 6,139,726 A * | 10/2000 | Greene | 210/94 |
| 6,182,453 B1 * | 2/2001 | Forsberg | 62/125 |
| 6,193,894 B1 | 2/2001 | Hollander | |
| 6,235,191 B1 | 5/2001 | Nakamura | |
| 6,313,468 B1 * | 11/2001 | Wedekamp | 250/373 |
| 6,451,209 B1 | 9/2002 | Kaas | |
| 6,461,520 B1 * | 10/2002 | Engelhard et al. | 210/748 |
| 6,463,956 B2 | 10/2002 | Walker | |
| 6,469,308 B1 | 10/2002 | Reed | |
| 6,483,119 B1 | 11/2002 | Baus | |
| 6,582,563 B1 * | 6/2003 | Adam et al. | 202/83 |
| 6,669,838 B1 * | 12/2003 | Baarman | 210/85 |
| 2002/0046569 A1 * | 4/2002 | Faqih | 62/188 |
| 2003/0052277 A1 | 3/2003 | Walker | |
| 2005/0139552 A1 * | 6/2005 | Forsberg et al. | 210/748 |

FOREIGN PATENT DOCUMENTS

| | | | |
|---|---|---|---|
| EP | 0 653 520 A2 | | 5/1995 |
| JP | 3-43398 | * | 2/1991 |
| JP | 3-72992 | * | 3/1991 |

* cited by examiner

WATER DISPENSING APPARATUS WITH WATER RECIRCULATION LINE

FIELD

This disclosure relates to a water purification and dispensing apparatus that purifies water and dispenses the purified water. In particular, this disclosure relates to a water purification and dispensing apparatus that includes a water recirculation line with a water treatment mechanism for purifying the water in a water reservoir.

BACKGROUND

A variety of different types of water purification and dispensing systems are known. Some utilize recirculation of water held in a reservoir to enhance the purity of the water in the reservoir. The recirculation can be coupled with additional treatment, such as ultraviolet sterilization, to further enhance the purity of the water. An example of a system that utilizes recirculation and ultraviolet sterilization is disclosed in U.S. Pat. No. 4,969,991.

Many of these known systems utilize multiple pumps to achieve water movement, as well as complicated valve systems to control the flow of water. This adds complexity as well as added cost to these systems.

There is, however, a continuing need for an improved water purification and dispensing apparatus.

SUMMARY

The disclosure relates to an improved water purification and dispensing apparatus, having less complexity and cost than previously known apparatus.

In one aspect, an apparatus for treating and dispensing potable water comprises a water reservoir, a closed recirculation line external to the reservoir having an inlet connected to the reservoir and an outlet connected to the reservoir, a pump connected to the recirculation line for pumping potable water through the recirculation line, a water treatment mechanism in the recirculation line between the inlet and the outlet, the treatment mechanism comprising an ultraviolet lamp, a first potable water dispensing outlet, separate from the recirculation line, connected to the reservoir, and a second potable water dispensing outlet, separate from the recirculation line, connected to the reservoir.

These and various other advantages and features of novelty which characterize the disclosed embodiment(s) are pointed out with particularity in the claims annexed hereto and forming a part hereof. However, for a better understanding of the concepts covered by the claimed invention, and the advantages and objects obtained thereby, reference should be made to the drawings which form a further part hereof, and to the accompanying description which describes one embodiment.

DETAILED DESCRIPTION

Figure 1:
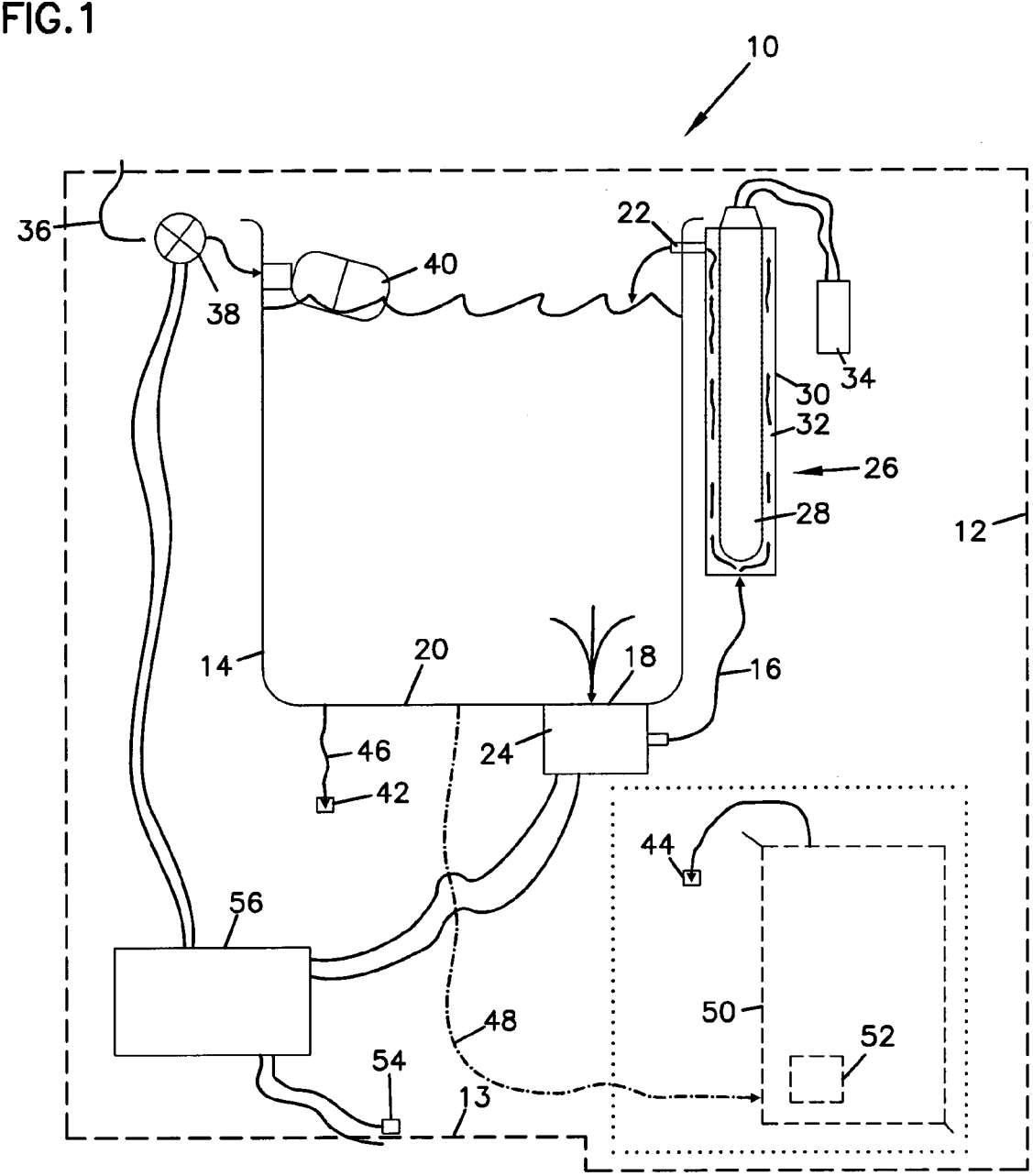
FIG. 1 is a schematic depiction of the water purification and dispensing apparatus further described herein.

One implementation of a water purification and dispensing apparatus 10 embodying the inventive concepts is illustrated in FIG. 1. In the illustrated embodiment, the apparatus 10 functions as a stand alone unit that is connected to a water supply, purifies the water, and dispenses purified water.

The apparatus 10 includes a housing 12 that contains a water reservoir 14 that holds a predetermined amount of water waiting to be dispensed. For example, a water reservoir 14 that holds about 3.5 liters could be used. A recirculation line 16 is provided to recirculate the water held by the reservoir 14 through a water treatment mechanism 26 in order to prevent bacteria growth in the water. As illustrated, the line 16 is external to the reservoir 14. The recirculation of water through the line 16 is preferably continuous. However, if water conditions dictate (e.g. high nitrates and high nitrites), recirculation could be performed on a periodic basis to limit the uv exposure from the water treatment mechanism 26 (to be later described) to levels that will not react and create taste issues with constituents in the water. The line 16 is preferably a closed recirculation line, meaning that there are no exits for water between the inlet and the outlet of the line 16.

The line 16 includes an inlet 18 connected to the base 20 of the reservoir 14, through which water to be recirculated enters the line 16. The line 16 also includes an outlet 22 that extends into an upper portion of the reservoir, preferably above the water line of the water within the reservoir 14.

A pump 24 is mounted to the base 20 of the reservoir 14 and is connected into the line 16 for pumping water through the line 16. When continuous circulation is desired, the pump 24 preferably operates continuously in order to circulate water through the line 16 continuously. The pump 24 is preferably a centrifugal fountain pump constructed of materials F.D.A. approved to be in contact with food and water, operating at 120 Volts AC, and capable of delivering up to 50 GPH (gallons-per-hour) at greater than 18-inches of static head. A suitable pump is the Jebo Submersible Pump, available from Zhongshan Jebao Electrical Appliances Co., LTD. of Taiwan, model # PP-333.

By mounting the pump 24 on the base 20, water from the reservoir 14 enters the pump through the inlet 18 via gravity. As a result, the pump 24 is continuously primed by the water. Further, the pump 24 can be made physically smaller and produce less pressure. With the water level as indicated in the reservoir 14, the pump 24 needs to pump a very low value of water head. Under static conditions, the level of the reservoir 14 and the water level in the water treatment mechanism 26 are the same because the pump is configured so that it does not block water from moving through it. As the level of water above the pump rises, water passes through it via gravity, and rises up into the water treatment mechanism 26. As a result, due to gravity, most of the recirculation work is already done, and the pump is used to merely force water up the last small distance and back into the reservoir 14. This configuration greatly improves the likelihood that the relatively inexpensive fountain pump 24 will last for several years.

The water treatment mechanism 26 is disposed in the recirculation line 16 between the inlet 18 and the outlet 22 and is oriented vertically. The water treatment mechanism 26 is constructed to treat the water that is recirculated through the line 16 in order to improve the purity of the water.

Preferably, the treatment mechanism 26 comprises an ultraviolet lamp 28 (shown in dashed lines in FIG. 1) and a housing 30 surrounding the lamp 28. A water passageway 32 is defined between an exterior surface of the lamp and an interior of the housing though which water flows as shown by the arrows in FIG. 1. The water passageway 32 is configured to minimize the depth of water film flowing by the uv lamp 28, thereby maximizing the amount of water contacted by ultraviolet light from the lamp 28, which maximizes the ultraviolet light dose applied to the water and maximizes the effectiveness of the water treatment.

A ballast and sensor assembly 34 is connected to the lamp 28. The assembly 34 comprises a ballast mechanism that develops the high voltage necessary to ignite the mercury vapor inside the lamp 28. In addition, the assembly 34 includes a sensor that supervises operation of the lamp 28 and provides a warning when improper lamp operation is detected. The sensor monitors electrical current flow through the lamp. When current ceases to flow through the lamp, for example resulting from an open filament, the sensor sends a signal to a signal generator that produces an alarm signal, preferably an audible signal, indicating a failure of the lamp.

Figure 2:
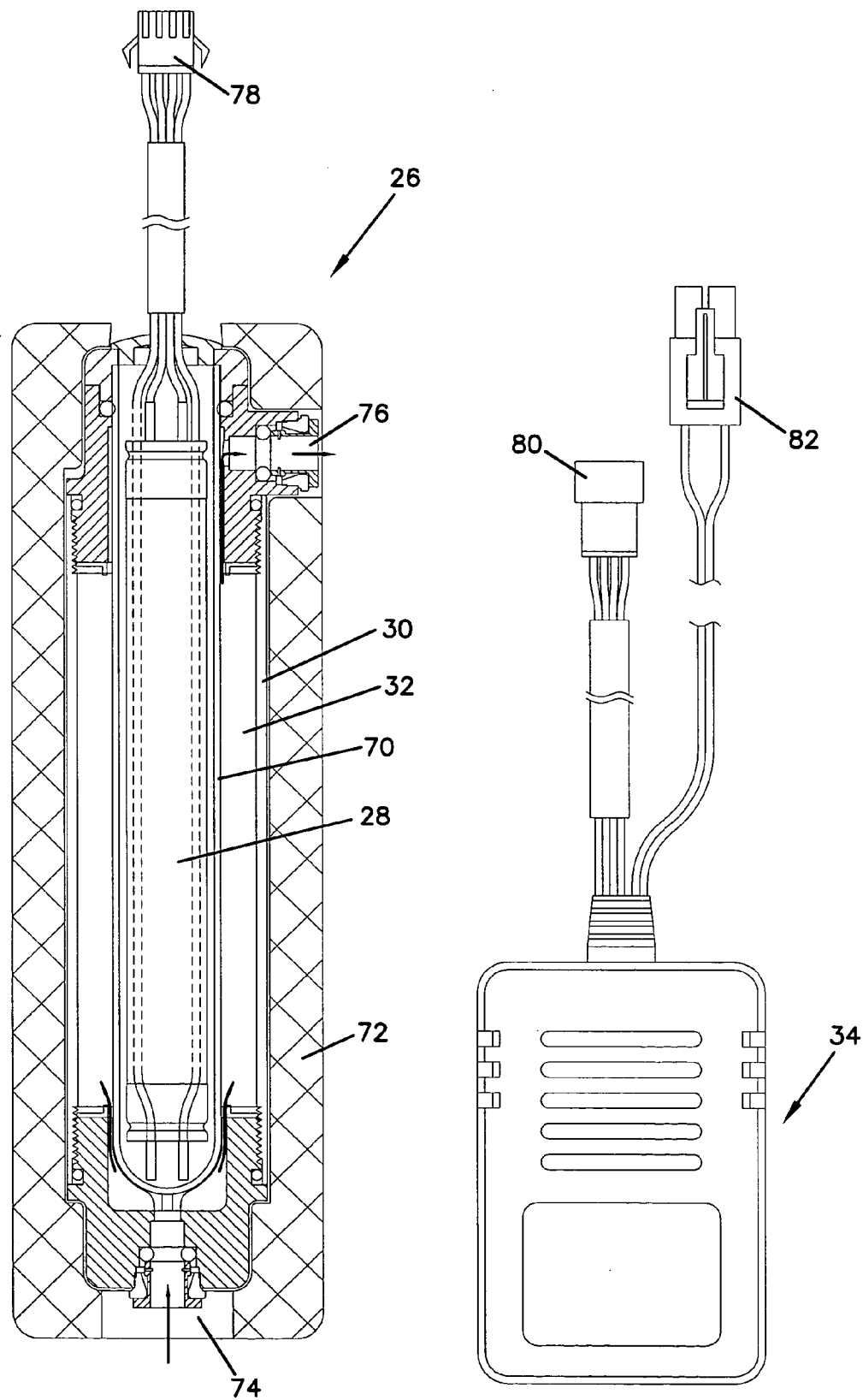
FIG. 2 illustrates details of the ultraviolet water treatment mechanism together with the ballast and sensor assembly.

The treatment mechanism 26 and ballast and sensor assembly 34 are shown in more detail in FIG. 2. The uv lamp 28 is disposed inside a quartz tube 70, and the housing 30, which is preferably made of stainless steel, surrounds the tube 70 with the passageway 32 defined between the tube 70 and the housing 30. A foam cover 72 preferably surrounds the housing 30. Water flows into the mechanism 26 through an inlet 74, flows around and past the end of the tube 70 and into the passageway 32, and flows out of the mechanism 26 through an outlet 76. The mechanism 26 also includes an electrical connector 78 for electrical connection with a power output lead 80 of the ballast and sensor assembly 34. Electrical power is provided to the ballast and sensor assembly 34 through a power input 82.

Figure 3:
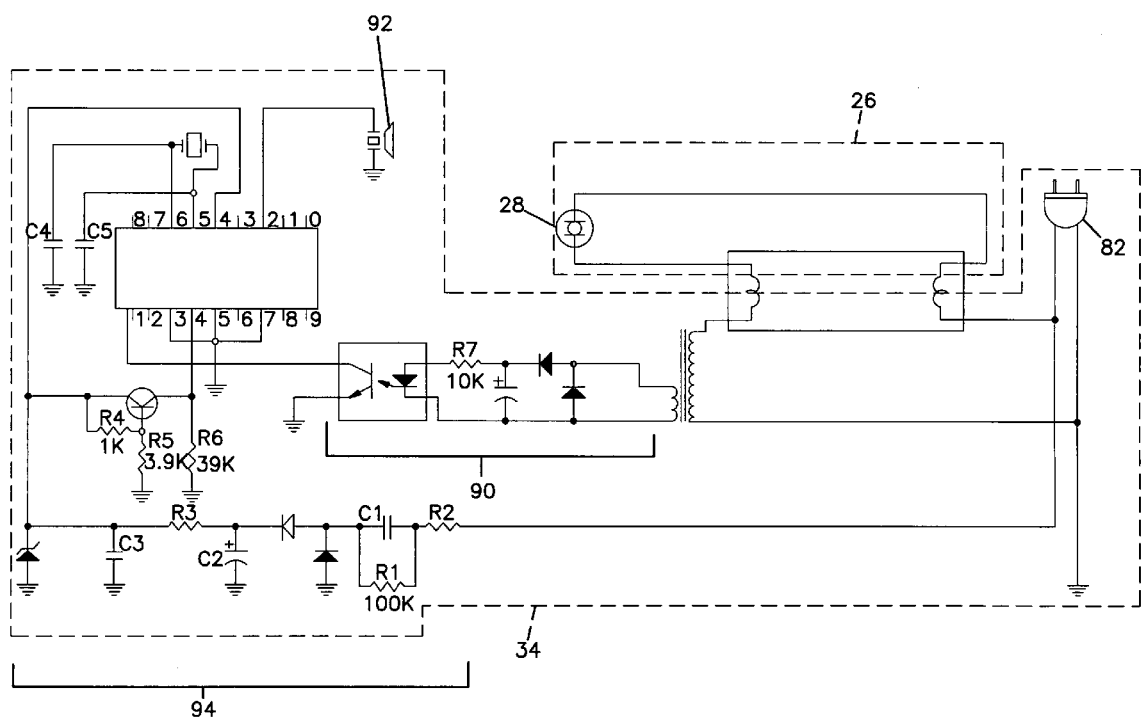
FIG. 3 is an electrical schematic of the ultraviolet water treatment mechanism and the ballast and sensor assembly.

FIG. 3 is an electrical schematic of the treatment mechanism 26 and the ballast and sensor assembly 34. The assembly 34 includes sensor circuitry 90 for supervising operation of the lamp 28, and a signal generator 92 in the form of a buzzer that is triggered by the sensor circuitry 90 when improper lamp operation is detected. Filtering circuitry 94 is also provided to filter the incoming electrical power.

Returning to FIG. 1, the recirculation line 16 is devoid of valves and exit points for water, because the line 16 is used to recirculate and treat the water, with water discharge from the reservoir 14 being provided through other means separate from the recirculation line. As a result, the recirculation line is simple in design and construction.

The water level in the reservoir 14 is maintained by admitting water through a water inlet line 36. The inlet line 36 can be a tap water supply line, or any other water source. A shut-off valve 38, which in the illustrated embodiment is a solenoid-operated valve, in the water inlet line 36 controls water flow through the water inlet line 36.

A float 40 is disposed in the reservoir 14 for controlling the water level in the reservoir 14. When the reservoir 14 is full, the float 40 closes off incoming water from the valve 38. The valve 38 stays open during normal operation and water pressure pushes against the float 40 so that when water is dispensed from the reservoir 14 through either of the outlets 42 or 44, the float can allow water to enter the reservoir 14. In other words, under normal operating conditions, water pressure is always present to the float 40, and water into the reservoir is controlled by the float 40. However, if a leak is detected or if power is lost to the apparatus 10, the valve 38 closes and prevents water from getting to the float 40.

The apparatus 10 also includes a first potable water dispensing outlet 42 connected to the reservoir 14 for dispensing potable water from the apparatus 10, and a second potable water dispensing outlet 44 connected to the reservoir 14 for dispensing potable water from the apparatus 10. The first and second outlets 42, 44 can be spigots or other manually controlled valves. The first dispensing outlet 42 is part of a first water outlet line 46 extending from the base 20 of the reservoir 14 for dispensing water of a first temperature. Likewise, the second dispensing outlet 44 is part of a second water outlet line 48 extending from the base 20 of the reservoir 14 for dispensing water of a second temperature. The placement of the outlet lines 46, 48 is such that the water is gravity fed from the reservoir 14. As a result, the outlet lines 46, 48 are devoid of pumps.

Preferably, the temperature of the water from the second outlet 44 is greater than the temperature of the water from the first outlet 42. The higher water temperature is achieved by providing a hot water tank 50 in the water outlet line 48, with a heater 52 disposed in the tank 50 for heating the water. The heater 52 can be a 120 VAC, 500 watt stainless steel immersion heater.

As a safety feature, the apparatus 10 is provided with a conductivity sensor 54 mounted within the housing 12 adjacent the base 13 of the housing for detecting water spillage or leaks from the apparatus. The sensor 54 is connected to the valve 38, via a controller 56, for closing the valve 38 when the sensor 54 detects a spill or leak. Further, the controller 56 is connected to the pump 24 to shut the pump off when the sensor 54 detects a water spill or leak. This prevents the pump 24 from running dry and failing in the event that all the water leaks from the reservoir 14.

Since many embodiments employing the inventive concepts can be made without departing from the spirit and scope of the inventive concepts, the invention resides in the claims hereinafter appended.

What is claimed is:

1. A apparatus for treating and dispensing potable water, comprising:

a housing (12) having a housing base (13);

a potable water reservoir (14) disposed within said housing (12) and having a reservoir base (20) positioned at an elevation above said housing base (13);

a reservoir inlet (36) adapted to receive water from a source external to said housing (12) with means (40, 38) for defining a maximum water level within said reservoir (14);

a closed recirculation line (16) external to the reservoir (14) having a recirculation line inlet (18) connected to the reservoir (14) disposed at said housing base (13) and a recirculation line outlet (22) connected to the reservoir above an elevation of said maximum water level, whereby water is urged to flow under influence of gravity from said reservoir (14) and through said recirculation line (16) to an elevation in said recirculation line (16) in common with an elevation of water within said reservoir (14);

a water treatment mechanism (26) in the recirculation line (16) between the recirculation line inlet (18) and the recirculation line outlet (22), the treatment mechanism (26) comprising an ultraviolet lamp (28), said water treatment apparatus (26) adapted for treating water flowing through said recirculation line (16), said water treatment apparatus (26) having a treatment passageway (32) disposed at an elevation above said housing base (13) and with at least a portion of said treatment passageway (32) disposed beneath said maximum water level;

a pump (24) connected to the recirculation line (16) for pumping potable water through the recirculation line (16), said pump (24) disposed at said reservoir base (20), said pump (24) adapted to permit water to pass through said pump (24) in response to gravity force on water within said reservoir (14);

a first potable water dispensing outlet (42), separate from the recirculation line (16) connected to the reservoir (14) at said reservoir base (13) for gravity flow of water from said reservoir (14) and out of said first potable water outlet (42); and a second potable water dispensing outlet (44), separate from the recirculation line (16), connected to the reservoir (14) at said reservoir base (13) for gravity flow of water from said reservoir (14) and out of said second potable water outlet (44).

2. The apparatus of claim 1, further comprising a first water outlet line connected to the reservoir, the first water outlet line including the first dispensing outlet, and a second water outlet line connected to the reservoir, the second water outlet line including the second dispensing outlet, and wherein the first water outlet line and the second water outlet line extend from the base of the reservoir.

3. The apparatus of claim 2, further comprising a hot water tank connected to the second water outlet line, and a heater for heating water that exits the reservoir via the second water outlet line.

4. The apparatus of claim 1, wherein the treatment mechanism further comprises a housing surrounding the lamp, said treatment passageway being defined between an exterior of the lamp and an interior of the housing.

5. The apparatus of claim 1, further comprising a ballast mechanism connected to the lamp for initiating operation of the lamp, and a sensor connected to the lamp that senses operation of the lamp.

6. The apparatus of claim 5, wherein the sensor is connected to a signal generator that produces an alarm signal when improper operation of the lamp is detected.

7. The apparatus of claim 1, wherein said a reservoir inlet comprises a water inlet line connected to the reservoir, and wherein said means (40, 38) comprises a valve in the water inlet line for controlling water flow through the water inlet line, and a float in the reservoir connected to the valve for controlling the valve.

8. The apparatus of claim 7, further comprising a conductivity sensor mounted within the housing, a controller connected to the conductivity sensor and to the valve for controlling the valve.

9. The apparatus of claim 8, wherein the controller is connected to the pump.

10. The apparatus of claim 1, wherein the pump is a centrifugal fountain pump.

\* \* \* \* \*